W. V. TURNER.
SAFETY CAR CONTROL EQUIPMENT.
APPLICATION FILED JUNE 29, 1917.
1,265,005.
Patented May 7, 1918.
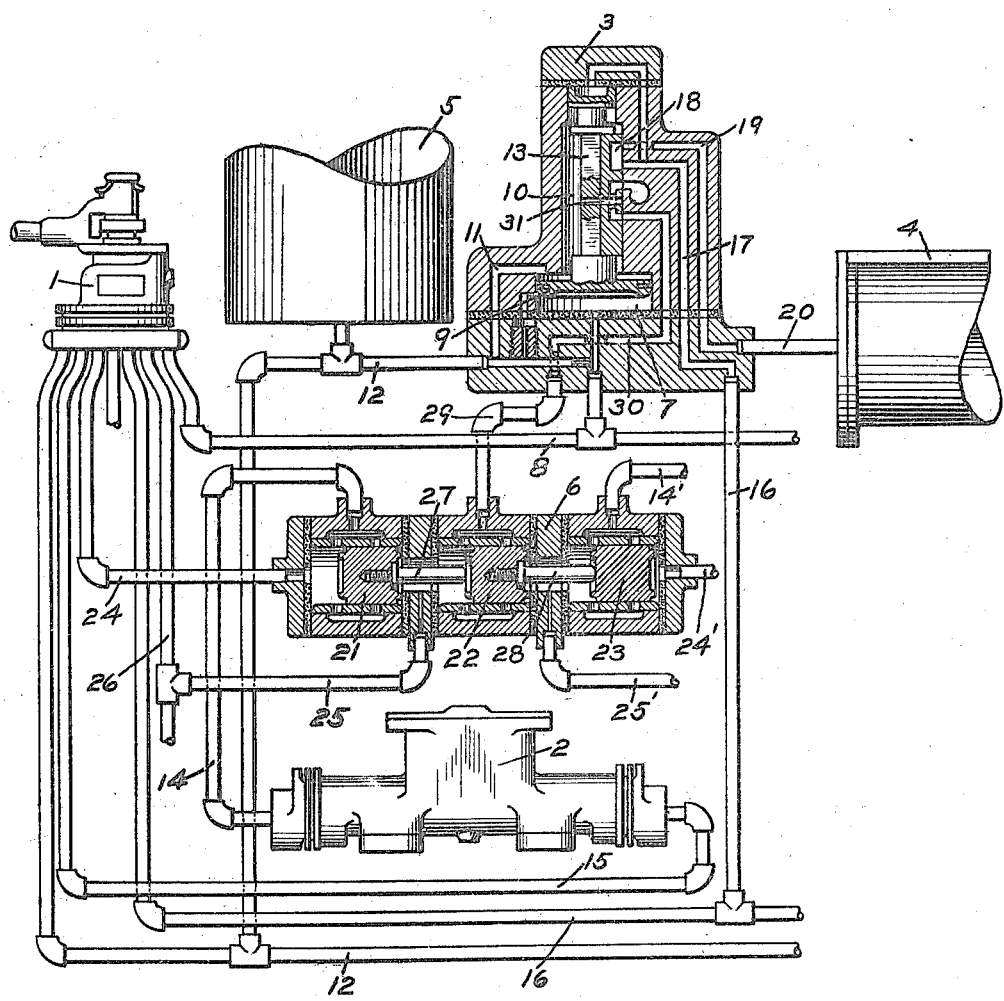
INVENTOR
Walter V. Turner
by Wm. M. Cady
Atty.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SAFETY CAR-CONTROL EQUIPMENT.

1,265,005.  Specification of Letters Patent.  Patented May 7, 1918.

Application filed June 29, 1917. Serial No. 177,761.

*To all whom it may concern:*

Be it known that I, WALTER V. TURNER, a citizen of the United States, residing at Wilkinsburg, in the county of Allegheny and State of Pennsylvania, have invented new and useful Improvements in Safety Car-Control Equipments, of which the following is a specification.

This invention relates to a safety car control equipment, and more particularly to an equipment in which means are provided for controlling the car doors.

With an equipment of the above character, where the apparatus is adapted to be controlled from either end of the car, it is desirable to prevent operation at the non-operating end of the car.

The principal object of my invention is to provide means for automatically preventing the operation of the car doors at the non-operating end of the car.

Other objects and advantages will appear in the following more detailed description of the invention.

In the accompanying drawing, the single figure is a diagrammatic view of a portion of a safety car control equipment, partly in section, and embodying my invention.

As shown in the drawing, the equipment may comprise a brake valve 1 at opposite ends of the car, a door controlling motor 2 for each end of the car, an emergency valve device 3, a brake cylinder 4, a reservoir 5, and a triplex check valve device 6.

The emergency valve device 3 may comprise a casing having a piston chamber 7 connected to emergency brake pipe 8 and containing a piston 9 and having a valve chamber 10 connected by passage 11 to pipe 12 leading to the reservoir 5, and containing a slide valve 13.

The door controlling motor 2 is provided with a pipe 14, the admission of fluid under pressure to which causes the door motor to effect the opening of the car doors and a pipe 15, the admission of fluid to which causes the door motor to effect the closing of the doors.

For controlling the brakes by straight air, a straight air pipe 16 is provided which leads from the brake valve 1 to a passage 17 in the emergency valve device, said passage being connected in the normal release position of the emergency valve device through cavity 18 in slide valve 13 with passage 19 leading to brake cylinder pipe 20.

The triplex check valve device may comprise three double seating check valves 21, 22, and 23, the chamber at the outer face of check valve 21 being connected by pipe 24 to brake valve 1 at one end of the car and the chamber at the outer face of check valve 23 being connected by pipe 24' to the brake valve 1 at the opposite end of the car.

Pipe 14 leads to ports controlled by the double check valve 21 and pipe 14' from the door motor 2 at the opposite end of the car leads to ports controlled by the check valve 23.

The chamber intermediate the check valves 21 and 22 is connected by pipe 25 with sander pipe 26 leading to the brake valve 1 and a pipe 25' leads from the chamber intermediate the check valves 22 and 23 to the sander pipe at the opposite end of the car.

The check valves 21 and 22 are provided with the respective stems 27 and 28 through which the check valve 22 can be operated upon movement of the check valves 21 and 23.

The check valve 22 controls ports which lead to a pipe 29 connected to a passage 30 leading to the seat of slide valve 13.

In operation, the car doors at the operating end of the car may be controlled at will by the operator, and if it is desired to open the doors, the brake valve 1 is turned to door opening position, in which fluid under pressure is supplied through pipe 24 to check valve 21 and said check valve is then forced to the left if not already there. Communication is then opened to pipe 14, so that fluid is supplied to the door opening side of the door motor 2. The pipe 15 is connected to the exhaust through the brake valve and the door motor then operates to open the doors. The doors may be closed by turning the brake valve to door closing position, in which pipe 24 is connected to the exhaust and fluid under pressure is supplied to pipe 15 for actuating the door motor to effect the closing of the doors.

The brakes may be applied and released in normal service by respectively supplying and releasing fluid to and from the straight air pipe 16 which is normally connected to the brake cylinder 4 through cavity 18 in the slide valve 13.

Upon the initiation of an emergency application of the brakes, the emergency piston 9 is shifted outwardly by the reduction in pressure in the brake pipe 8 and the slide valve 13 is moved to connect passage 19 with valve chamber 10, so that fluid is supplied from reservoir 5 directly to the brake cylinder 4.

This movement of slide valve 13 also connects passage 30 through port 31 with valve chamber 10, so that fluid under pressure is supplied to pipe 29, thence to the chamber intermediate the check valves 21 and 22, the check valve 22 having been shifted to the left by the stem 27 when the check valve 21 is actuated.

The check valve 21 is thereupon shifted to the right so as to open communication from the pipe 9 to the pipe 14 and fluid is supplied to the door motor 2 to effect the opening of the doors at the operating end of the car automatically, when an emergency application of the brakes is made.

Fluid is also supplied from the chamber intermediate the check valves 21 and 22 to pipe 25 and thence flows to pipe 26 to effect the sanding of the rails at the operating end of the car ahead of the car wheels.

If the car is controlled by the brake valve at the opposite end of the car, the check valve 23 is shifted to the right by movement of the brake valve to door opening position, so that through stem 28 the check valve 22 is also shifted to the right.

This movement of the check valves operates to open communication to the door motor at the opposite end of the car which is now the operating end and also causes the check valve 22 to establish communication for effecting the sanding at the operating end when an emergency application of the brakes is made through pipe 25'.

It will now be seen that the triplex check valve device operates automatically to establish communication for controlling the doors and the sanding of the rails, so that only at the operating end are the doors opened and the rails sanded when an emergency application of the brakes is made.

Having now described my invention, what I claim as new and desire to secure by Letters Patent, is:

1. The combination with valve means for controlling fluid for effecting the operation of the car doors, of a valve controlled by said valve means for controlling fluid for effecting the sanding of the rails.

2. The combination with a check valve for controlling fluid for effecting the operation of the car doors, of a check valve operated by the first check valve for controlling fluid for effecting the sanding of the rails.

3. The combination with fluid operated motors for controlling the car doors at opposite ends of the car and a valve device for effecting an application of the brakes and adapted to supply fluid to said motors, of valve means for controlling communication from said valve device to the door motors and means operated by fluid pressure supplied at the operating end for operating said valve means to close communication from said valve device to the door motor at the non-operating end of the car.

4. The combination with a valve device for effecting an application of the brakes and for controlling fluid for operating the doors at opposite ends of the car, of valve means for controlling the supply of fluid from said valve device for operating the doors and means operated by fluid under pressure supplied at the operating end of the car for actuating said valve means to close communication from said valve device to the non-operating end of the car.

5. The combination with a valve device for effecting an application of the brakes and for controlling fluid for operating the doors at opposite ends of the car, of a double check valve for each end of the car adapted to control communication from said valve device through which fluid is supplied for operating the doors and a double check valve operated by one of the first mentioned check valves at the operating end of the car for closing communication through which fluid is supplied for operating the doors at the non-operating end of the car.

6. The combination with separate fluid operated motors for controlling the doors at opposite ends of the car and a valve device for effecting an application of the brakes and for supplying fluid under pressure to said motors, of brake valves at opposite ends of the car for also supplying fluid to said motors, a double check valve associated with each brake valve for controlling communication from the brake valve and from said valve device to the door motors and a double check valve operated by one of the first mentioned check valves at the operating end of the car for cutting off communication from said valve device to the door motor at the opposite end of the car.

7. The combination with a manually operated valve at each end of the car for supplying fluid for operating the car doors and a valve device for effecting an application of the brakes and for also supplying fluid for operating the car doors, of a valve for controlling communication through which fluid is supplied from each brake valve and from said valve device for operating the doors and a valve operated by one of the other valves for controlling communication from said valve device through which fluid is supplied for operating the doors at the opposite ends of the car.

8. The combination with a valve device for effecting an application of the brakes and for supplying fluid for operating car doors at opposite ends of the car and a brake valve at each end of the car for also supplying fluid for operating the car doors, of a double check valve for each end of the car operated by fluid supplied from the corresponding brake valve and a double check valve actuated by one of the first mentioned check valves for controlling communication from said valve device through which fluid is supplied for operating the doors.

9. The combination with a valve device for effecting an application of the brakes and for supplying fluid for operating car doors at opposite ends of the car and a brake valve at each end of the car for also supplying fluid for operating the car doors, of a double check valve for each end of the car operated by fluid supplied from the corresponding brake valve and a double check valve actuated by one of the first mentioned check valves for controlling communication from said valve device through which fluid is supplied for operating the doors and for controlling communication through which fluid is supplied for sanding the rails.

10. The combination with a fluid operated motor for controlling the doors at each end of the car, a manually operated valve at each end of the car for supplying fluid to a corresponding door motor and a valve device for effecting an application of the brakes and for supplying fluid to the door motors, of a double check valve operated by the flow of fluid from the corresponding manually operated valve for opening communication from said valve to the door motor and for closing communication from said valve device to the door motor and a double check valve actuated by the first mentioned check valve for opening communication through which fluid is supplied from said valve device to one door motor and for closing communication through which fluid is supplied to the other door motor.

In testimony whereof I have hereunto set my hand.

WALTER V. TURNER.

Copies of this patent may be obtained for five cents each, by addressing the "Commissioner of Patents, Washington, D. C."